United States Patent [19]

Gardner

[11] Patent Number: 4,848,759

[45] Date of Patent: Jul. 18, 1989

[54] HOLDING APPARATUS

[76] Inventor: Warren A. Gardner, 4470 Yarrow St., Wheat Ridge, Colo. 80033

[21] Appl. No.: 159,302

[22] Filed: Feb. 22, 1988

[51] Int. Cl.$^4$ .............................................. B23Q 1/04
[52] U.S. Cl. ..................................................... 269/51
[58] Field of Search ........................ 269/50, 51, 52, 47, 269/71, 77, 78, 81, 99, 100, 264, 95

[56] References Cited

U.S. PATENT DOCUMENTS

| | | | |
|---|---|---|---|
| 1,330,318 | 2/1920 | Hardy | 269/50 |
| 1,486,481 | 3/1924 | Cole | 269/50 |
| 2,568,508 | 9/1951 | Montague | 269/51 |
| 2,995,357 | 8/1961 | Dennis et al. | 269/51 |
| 3,048,387 | 8/1962 | Waggoner | 269/51 |
| 3,083,004 | 3/1963 | Clark | 269/51 |
| 3,306,601 | 2/1967 | Mitchell | 269/50 |
| 4,577,843 | 3/1986 | Milwein | 269/51 |

Primary Examiner—Robert C. Watson
Attorney, Agent, or Firm—Arthur L. Urban

[57] ABSTRACT

Component holding apparatus includes a base portion, a supporting portion, a connecting portion, a securing portion and a pivot control portion. The base portion includes a main section with a first sleeve section extending therefrom, the first sleeve section having an axis substantially parallel to a major plane of the main section. The supporting portion includes an elongated first rod member having one end rotatably supported within the first sleeve section and extending therefrom a short distance in one direction and a greater distance in an opposite direction. A second sleeve section is affixed adjacent an end of the first rod member remote from the first sleeve section, an axis of the second sleeve section being oriented at an angle to an axis of the first rod member. The connecting portion includes a second rod member pivotally supported within the second sleeve section and extending beyond an end thereof. A pair of arm members is pivotally supported on an exposed end of the second rod member with a bolt member extending substantially perpendicularly from a remote end of each arm member. A spacer is disposed along the length of each bolt member. The securing portion includes a first fastener selectively engageable with a free end of each bolt member remote from the respective arm member. The pivot control portion includes second fasteners selectively engageable along the length of exposed ends of the first and second rod members extending from the first and second sleeve sections.

16 Claims, 1 Drawing Sheet

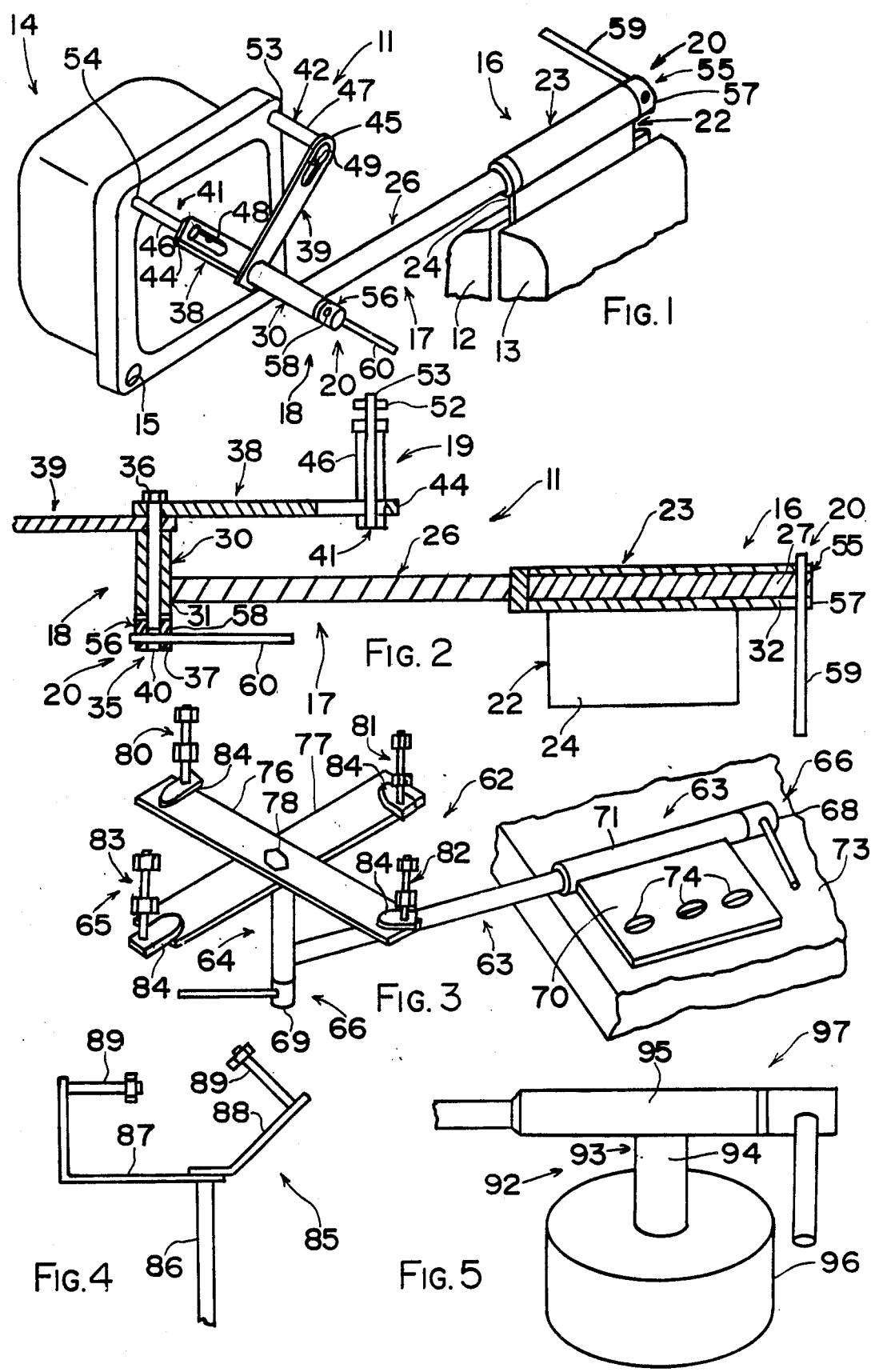

HOLDING APPARATUS

This invention relates to a novel holding apparatus and more particularly relates to a new apparatus for holding and pivoting a component or the like.

The inspection and/or servicing of components of machinery and equipment has become a normal part of maintenance procedures. In recent years, as the machinery has become more sophisticated, the components thereof also have become more complex, precise and delicate. Improper inspection or servicing of such precision components easily can result in damage and/or destruction of the components.

An example of such a component is a carburetor of an internal combustion engine. When servicing a carburetor, a mechanic ordinarily will remove the component from an engine, take it to a workbench or similar surface and secure it thereto with a vise, clamp or other tool holder. While such devices may hold the component in a particular position, it may be necessary to rotate the component into more than one orientation in order to expose the various parts of the component for inspection and/or servicing.

However, with some components, i.e. a carburetor body, the next desired position may place the component into an orientation which does not permit the vise, etc. to secure the component without damage thereto. In an attempt to hold such a component in different positions without damaging it, a person may have to create some makeshift holder such as securing a tapered rod or punch in the vise and then hanging a carburetor body on the free upper end of the rod by sliding one of the bolt holes over the rod. Such a mounting is not very stable and requires careful attention on the part of the serviceman to avoid knocking the component off the rod and causing it to fall and be damaged.

Some people may utilize spaced rods to mate with several bolt holes. Spacing the rods accurately to mate with several bolt holes can be a frustrating and timeconsuming task that may have to be repeated with each change in position.

Another way to position a component in a desired orientation may be to use deformable padding such as cloths or stuffing under a component and to reshape the padding for each position change. Although this expedient places a component in a desired position initially, pressure against the component during servicing may shift the orientation thereof and require replacement of the component and supporting padding again and again in a single position.

The above procedures may allow a mechanic to observe the various parts of a component, but they do not provide a means for achieving the desired results while enabling a workman to function efficiently. As a result, the time required to accomplish the task is significantly increased, resulting in higher costs for the customer. Also, when a component is accidentally damaged, the cost of replacement is charged to the customer. In both situations, the customer pays extra because of the deficiencies of the procedures.

From the above discussion, it is clear that previous expedients do not satisfy the requirements of workmen servicing small delicate precision components. Thus, there is a need for a new means for facilitating the inspection/servicing of such components.

The present invention provides a novel holding apparatus for components such as a carburetor body, which require several position changes to expose particular parts thereof. The holding apparatus of the invention enables a workman to inspect and service efficiently all areas of a precision component. The holding apparatus permits rotation of a component along more than one axis while retaining the component safely.

The holding apparatus of the present invention is simple in design and can be produced relatively inexpensively. Commercially available materials can be utilized in the manufacture of the apparatus of the invention. The apparatus can be fabricated by semi-skilled labor employing conventional metal working techniques and procedures.

The holding apparatus of the invention not only improves a workman's productivity, but also reduces the possibility of accidental damage of precision components. These improvements are achieved by workmen with all levels of experience and especially those who have limited experience and skills.

The holding apparatus can be modified easily and simply to accommodate different components. The apparatus is durable in construction and has a long useful life. A minimum of maintenance is required to keep the apparatus in good working condition.

These and other benefits and advantages of the novel holding apparatus of the present invention will be apparent from the following description and the accompanying drawings in which:

FIG. 1 is a view in perspective of one form of holding apparatus of the invention in use;

FIG. 2 is an enlarged side view partially in section of the holding apparatus shown in FIG. 1;

FIG. 3 is a view in perspective of another form of holding apparatus of the invention;

FIG. 4 is a side view of a further form of connecting portion of holding apparatus of the invention; and FIG. 5 is a view in perspective of another form of base portion of holding apparatus of the invention.

As shown in the drawings, one form of holding apparatus 11 of the present invention is mounted between vise jaws 12 and 13. A component shown as carburetor body 14 is mounted on the apparatus 11 for inspection and/or servicing. The holding apparatus 11 includes a base portion 16, a supporting portion 17, a connecting portion 18, a securing portion 19 and a pivot control portion 20.

The base portion 16 of the holding apparatus 11 of the invention includes a main section 22. A first sleeve section 23 extends from the main section. The first sleeve section has an axis substantially parallel to a major plane of the main section.

The main section 22 may have a number of different configurations. Advantageously, as shown in FIGS. 1-3, the main section may include a plate section 24. The first sleeve section 23 preferably is disposed in a generally horizontal orientation. The first sleeve section advantageously is disposed along an edge of the main section.

The supporting portion 17 of the holding apparatus 11 of the present invention includes an elongated first rod member 26. The first rod member has one end 27 that is rotatably carried by the first sleeve section 23. The first rod member 26 extends from the first sleeve section a short distance in one direction. The first rod member extends from the first sleeve section a greater distance in an opposite direction.

The first rod member 26 advantageously extends from the first sleeve section 23 a greater distance in one direction than the part thereof which is disposed within the first sleeve section. Preferably, the first rod member includes a stop section 28 along the length thereof and spaced from the end 27 a distance slightly greater than the length of the first sleeve section.

A second sleeve section 30 is affixed adjacent an end 31 of the first rod member 26 that is remote from the first sleeve section 23. An axis of the second sleeve section is oriented at an angle to an axis of the first rod member and advantageously generally perpendicular thereto.

The first rod member preferably includes a threaded section 32 at the end 27 thereof remote from the second sleeve section 30. Advantageously, the second sleeve section 30 has a length less than that of the first sleeve section 23.

The connecting portion 18 of the holding apparatus 11 includes a second rod member 35. The second rod member is pivotally supported within the second sleeve section 30. The second rod member 35 extends beyond an end 36 of the second sleeve section. The second rod member preferably includes a threaded section 37 at an end 40 thereof.

The connecting portion 18 also includes arm members shown as a pair of arm members 38 and 39. The arm members 38 and 39 are pivotally supported on an exposed end 36 of the second rod member 35. Bolt members 41 or 42 extend substantially perpendicularly from a remote end 44 or 45 of each arm member 38 and 39. Spacer means shown as sleeves 46 and 47 are disposed along the length of each bolt member 41 and 42.

Each of the arm members 38 and 39 advantageously includes a slot section 48 or 49 adjacent an end thereof that is remote from the second rod member 35. A bolt member 41 or 42 extends through each of the slot sections.

The securing portion 19 of the holding apparatus 11 of the invention includes first fastening means shown as nuts 52 selectively engageable with a free end 53 or 54 of each bolt member 41 or 42. The engagement of the nut is with an end 53 or 54 of the bolt member that is remote from the respective arm member.

The pivot control portion 20 of the holding apparatus 11 includes second fastening means 55 and 56 selectively engageable along the length of exposed end 27 of the first rod member 26 and exposed end 40 of the second rod member 35, respectively. Advantageously, the pivot control portion includes threaded second fastening means shown as threaded nuts 57 and 58 which are selectively engageable with threaded end sections 32 and 37 of the first and second rod members. The second fastening means 55 and 56 preferably include handle means 59 and 60 and most preferably slideable handles extending therefrom in a direction perpendicular to an axis of the respective rod member to facilitate the application of pressure in confined spaces.

In the use of the holding apparatus 11 as shown in FIGS. 1 and 2 of the drawings, plate section 24 is placed between vise jaws 12 and 13 with the connecting and securing portions 18 and 19 of the apparatus extending beyond a work surface (not shown). Then, the jaws are tightened around the plate section while maintaining the first rod member 26 in a generally horizontal orientation.

A carburetor body 14 which has been removed from an engine (not shown) is mounted on the holding apparatus 11 by aligning bolt openings 15 of the body with the free ends 53 and 54 of bolt members 41 and 42 respectively. With the body 14 in position over the bolt members, nuts 52 are threaded onto the bolts and tightened. If the spacing between the bolts differs from the spacing between the bolt openings of the carburetor body, the bolt members can be slid along the slot sections 48 and 49 and the angle between the arm members changed before inserting the bolts into the bolt openings.

To position the carburetor body in a desired orientation, nuts 57 and 58 are loosened in sequence. Loosening nut 58 with handle 60 allows second rod member 35 to rotate. With the carburetor body affixed to the second rod member through arm members 38 and 39 and bolt members 41 and 42, rotation of the rod member 35 rotates the body 14 up to 360° in a plane perpendicular to the rod member.

Loosening nut 57 with handle 59 permits rotation of the first rod member 26 in a full revolution. This rotation positions the carburetor body in a plane perpendicular to the first rod member. By an appropriate rotation of each rod member, all surfaces of the carburetor body can be observed sequentially for inspection and/or servicing. All of the inspection and servicing can be accomplished quickly and easily with confidence that the carburetory body will not be damaged by the holder or accidentally fall from its grasp. In the same way, other units may be serviced, for example, automotive components, e.g. alternators, generators, fuel injector throttle bodies, etc. as well as components from appliances, scientific instruments and devices and the like.

FIG. 3 illustrates another form of holding apparatus 62 of the present invention. Holding apparatus 62 is similar to holding apparatus 11 shown in FIGS. 1 and 2. Apparatus 62 includes a base portion 63, a supporting portion 64, a connecting portion 65, a securing portion 66 and a pivot control portion 67.

The base portion 63 includes a plate section 70 extending from first sleeve section 71. The plate section 70 includes spaced openings therethrough. This permits direct connection of the apparatus 62 to a work surface 73 with suitable fasteners e.g. screws 74 as shown.

The connecting portion 65 of holding apparatus 62 includes arm members 76 and 77 pivotally supported on second rod member 78 adjacent the center of each arm member. Also, four bolt members 80, 81, 82 and 83 extend from free ends of the arm members. To provide adjustment of the spacing between the bolt members 80-83, the bolt members include eccentric means 84 along the length thereof.

The holding apparatus 62 shown in FIG. 3 is used in the same way as described above for apparatus 11 except that plate section 70 is affixed directly to a work surface 73 through screws 74. Also, adjustment of the spacing between the four bolt members 80-83 is achieved by rotating the eccentrics 84 on the bolt members before tightening the carburetor body (not shown) in place. The body is rotated by loosening nuts 68 and 69, rotating the component into the desired orientation and retightening the nuts. Servicing can be completed quickly and efficiently.

FIG. 4 shows a further form of connecting portion 85. Connecting portion 85 includes a second rod member 86 from which arm members 87 and 88 extend. Arm member 87 includes a right angle bend along the length thereof while arm member 88 includes a 45° bend. These arm configurations orient bolt members 89 and 90 extending therefrom in different directions to accommodate non-standard bolt opening orientations in particular components. The connecting portion 85 is used in the same way as the connecting portion 18 of apparatus 11 described above with similar efficiencies.

FIG. 5 illustrates another form of base portion 92. Base portion 92 includes a main section 93 including a bar member 94. The bar member 94 extends between a first sleeve section 95 and a weighted base section 96. This construction provides a portable holding apparatus 97 that can be moved from one work station to another as desired without removing the component from the holding apparatus. The holding apparatus 97 with base portion 92 is used in the same way as apparatus 11 with similar results.

The holding apparatus of the present invention can be fabricated from a variety of different structural materials. Suitable materials include metals, plastics, wood, combinations thereof and the like. The particular materials selected will depend upon the severity of service contemplated and the service life anticipated.

The above description and the accompanying drawings show that the present invention provides a novel component holding apparatus with features and advantages not found in previous devices. The holding apparatus is especially useful for components that require several position changes to expose particular parts thereof. The holding apparatus of the invention permits rotation of a component along more than one axis up to a full 360° revolution. The apparatus provides safe retention of the component during all of the rotation steps as well as during inspection and/or servicing of the component.

The holding apparatus of the present invention is simple in design and can be produced relatively inexpensively. Commercially available materials can be utilized in the manufacture of the holding apparatus. Also, conventional metal working techniques and procedures can be employed by semi-skilled labor in the fabrication thereof.

The holding apparatus of the invention enables a workman to inspect and/or service all areas of a delicate precision component such as a carburetor body quickly and efficiently. The holding apparatus not only improves a workman's productivity, but also gives the workman confidence that accidental dislodgment of the component and resultant damage will not occur.

The holding apparatus can be modified easily to accommodate different components with non-standard bolt openings. The apparatus is durable in construction and has a long useful life with a minimum of maintenance.

It will be apparent that various modifications can be made in the particular holding apparatus described in detail above and shown in the drawings within the scope of the present invention. The size, configuration and arrangement of elements can be changed to meet specific requirements. For example, the number and shape of the arm members may be changed to provide more bolt members and/or bolts facing in different directions.

Also, the base portion can be of another design to accommodate particular worker stations. These and other changes can be made in the holding apparatus of the invention provided the functioning and operation thereof are not adversely affected. Therefore, the scope of the present invention is to be limited only by the following claims.

What is claimed is:

1. Component holding apparatus including a base portion, a supporting portion, a connecting portion, a securing portion and a pivot control portion; said base portion including a main section, a first sleeve section extending from said main section, said first sleeve section having an axis substantially parallel to a major plane of said main section; said supporting portion including an elongated first rod member having one end section rotatably supported within said first sleeve section, said first rod member extending therefrom a short distance in one direction and a greater distance in an opposite direction, said first rod member including a stop section disposed along the length thereof and spaced from said end section that extends through said first sleeve section a distance slightly greater than the length of said first sleeve section, a second sleeve section affixed adjacent an end of said first rod member remote from said first sleeve section, an axis of said second sleeve section being oriented at an angle to an axis of said first rod member; said connecting portion including a second rod member pivotally supported within said second sleeve section, said second rod member extending beyond an end of said second sleeve section, a pair of arm members pivotally supported on an exposed end of said second rod member, a bolt member extending substantiallly perpendicularly from a remote end of each arm member, spacer means disposed along the length of each bolt member; said securing portion including first fastening means selectively engageable with a free end of each of said bolt members remote from said respective arm member; said pivot control portion including second fastening means selectively engageable along the length of exposed ends of said first and second rod members extending from said first and second sleeve sections; whereby a component can be mounted on said apparatus through said bolt members and said component rotated to desired positions by adjusting said pivot control portion.

2. Component holding apparatus according to claim 1 wherein said main section of said base portion includes a plate section.

3. Component holding apparatus according to claim 1 wherein said main section of said base portion includes a bar member.

4. Component holding apparatus according to claim 1 wherein said first sleeve section is disposed in a generally horizontal orientation.

5. Component holding apparatus according to claim 1 wherein said first sleeve section is disposed along an end of said main section.

6. Component holding apparatus according to claim 1 wherein said first rod member extends from said first sleeve section in one direction a greater distance than the part thereof disposed within said first sleeve section.

7. Component holding apparatus according to claim 1 wherein said first rod member includes a threaded section at a free end thereof remote from said second sleeve section.

8. Component holding apparatus according to claim 1 wherein said second sleeve section is generally perpendicular to said first sleeve section.

9. Component holding apparatus according to claim 1 wherein said second sleeve section has a length less than that of said first sleeve section.

10. Component holding apparatus according to claim 1 wherein said second rod member includes a threaded section at an end thereof remote from said arm members.

11. Component holding apparatus according to claim 1 wherein said connecting portion includes arm members which are pivotally supported on said second rod member adjacent the center of each arm member.

12. Component holding apparatus according to claim 1 wherein each of said arm members includes a slot section adjacent an end thereof remote from said second rod member with a bolt member extending through said slot section.

13. Component holding apparatus according to claim 1 wherein said bolt members of said securing portion are operatively connected to said arm members through offset means.

14. Component holding apparatus according to claim 1 wherein said pivot control portion includes threaded second fastening means selectively engageable with threaded end sections of said first and second rod members.

15. Component holding apparatus according to claim 1 wherein said second fastening means of said pivot control portion includes handle means.

16. Component holding apparatus according to claim 1 wherein said second fastening means of said pivot control portion includes threaded nuts with handles extending therefrom perpendicularly to an axis of said first and second rod members.

* * * * *